(12) United States Patent
Cai

(10) Patent No.: US 11,133,698 B2
(45) Date of Patent: Sep. 28, 2021

(54) WIRELESS CHARGING SYSTEMS AND METHODS FOR CONTROLLING THE SAME

(71) Applicant: Wen Cai, Santa Clara, CA (US)

(72) Inventor: Wen Cai, Santa Clara, CA (US)

(*) Notice: Subject to any disclaimer, the term of this patent is extended or adjusted under 35 U.S.C. 154(b) by 187 days.

(21) Appl. No.: 16/558,134

(22) Filed: Sep. 1, 2019

(65) Prior Publication Data

US 2021/0066950 A1    Mar. 4, 2021

(51) Int. Cl.
| | | |
|---|---|---|
| *H02J 50/80* | (2016.01) | |
| *H02J 7/02* | (2016.01) | |
| *H01F 38/14* | (2006.01) | |
| *H02J 50/12* | (2016.01) | |

(52) U.S. Cl.
CPC .............. *H02J 7/025* (2013.01); *H01F 38/14* (2013.01); *H02J 50/12* (2016.02); *H02J 50/80* (2016.02)

(58) Field of Classification Search
USPC ......................................................... 320/108
See application file for complete search history.

(56) References Cited

U.S. PATENT DOCUMENTS

| | | |
|---|---|---|
| 5,450,616 A | 9/1995 | Rom |
| 5,767,791 A | 6/1998 | Stoop et al. |
| 5,774,791 A | 6/1998 | Strohallen et al. |
| 6,029,061 A | 2/2000 | Kohlschmidt |
| 6,573,826 B2 | 6/2003 | Pan |
| 6,771,614 B1 | 8/2004 | Jones, IV et al. |
| 6,778,556 B1 | 8/2004 | Chin et al. |
| 6,894,609 B2 | 5/2005 | Menard et al. |
| 6,985,755 B2 | 1/2006 | Cadieux et al. |
| 7,006,851 B2 | 2/2006 | Holmes et al. |
| 7,092,398 B2 | 8/2006 | Schweitzer |
| 7,133,373 B2 | 11/2006 | Hester |
| 7,142,813 B1 | 11/2006 | Desai |
| 7,289,518 B2 | 10/2007 | Huckins |
| 7,289,887 B2 | 10/2007 | Rodgers |
| 7,310,535 B1 | 12/2007 | MacKenzie et al. |
| 7,424,403 B2 | 9/2008 | Robinson et al. |
| 7,451,019 B2 | 11/2008 | Rodgers |
| 7,477,899 B2 | 1/2009 | Vasudevan |
| 7,477,911 B1 | 1/2009 | Praveen et al. |
| 7,508,781 B2 | 3/2009 | Liu et al. |
| 7,613,139 B1 | 11/2009 | Wang et al. |
| 7,809,087 B2 | 10/2010 | Filipovic |
| 7,900,070 B2 | 3/2011 | Wu et al. |
| 7,974,250 B2 | 7/2011 | Jang et al. |
| 7,983,230 B1 | 7/2011 | Li et al. |
| 7,986,968 B2 | 7/2011 | Dobrowski et al. |
| 8,149,969 B2 | 4/2012 | Khan et al. |
| 8,193,764 B2 | 6/2012 | Jakubowski |
| 8,213,403 B2 | 7/2012 | Shon et al. |
| 8,259,632 B2 | 9/2012 | Seok et al. |
| 8,364,338 B2 | 1/2013 | Peltonen et al. |
| 8,433,820 B2 | 4/2013 | Wang et al. |

(Continued)

*Primary Examiner* — Bryce M Aisaka
(74) *Attorney, Agent, or Firm* — Bayes PLLC

(57) ABSTRACT

Embodiments of magnetic field transfer circuits and methods for wirelessly charging electrical load herein. In one example, a magnetic field transfer circuit (MFCT) includes a first coil and a second coil. The first coil is configured to receive a first magnetic flux transmitted from a transmitter and convert the received magnetic flux to a current. The second coil is configured to transmit a second magnetic flux to a receiver based on the current.

17 Claims, 14 Drawing Sheets

(56) References Cited

U.S. PATENT DOCUMENTS

| | | |
|---|---|---|
| 8,437,275 B2 | 5/2013 | Banerjee et al. |
| 8,463,314 B2 | 6/2013 | Love et al. |
| 8,493,906 B1 | 7/2013 | Troxel et al. |
| 8,538,560 B2 | 9/2013 | Brown et al. |
| 8,571,600 B2 | 10/2013 | Sarkar et al. |
| 8,571,609 B2 | 10/2013 | Hwang et al. |
| 8,611,266 B2 | 12/2013 | Cho et al. |
| 8,630,215 B2 | 1/2014 | Park et al. |
| 8,645,732 B2 | 2/2014 | Naware et al. |
| 8,693,950 B2 | 4/2014 | Desai |
| 8,718,029 B1 | 5/2014 | Wong et al. |
| 8,724,662 B2 | 5/2014 | Toner et al. |
| 8,767,600 B2 | 7/2014 | Seok et al. |
| 8,769,257 B2 | 7/2014 | Sood |
| 8,797,944 B2 | 8/2014 | Choi et al. |
| 8,901,881 B2 | 12/2014 | Partovi |
| 8,923,176 B2 | 12/2014 | Kert et al. |
| 8,934,386 B2 | 1/2015 | Iyer et al. |
| 8,953,547 B2 | 2/2015 | Huang et al. |
| 9,014,682 B1 | 4/2015 | Lambert |
| 9,014,699 B2 | 4/2015 | Desclos et al. |
| 9,014,744 B2 | 4/2015 | Chu et al. |
| 9,014,751 B1 | 4/2015 | Choi et al. |
| 9,030,160 B2 | 5/2015 | Won et al. |
| 9,055,533 B2 | 6/2015 | Raskin et al. |
| 9,055,543 B2 | 6/2015 | Perrin et al. |
| 9,106,083 B2 | 8/2015 | Partovi |
| 9,118,188 B2 | 8/2015 | Doyle et al. |
| 9,119,185 B2 | 8/2015 | Huang et al. |
| 9,131,001 B2 | 9/2015 | Cherian |
| 9,178,569 B2 | 11/2015 | Chakravarty. et al. |
| 9,197,094 B2 | 11/2015 | Van Wiemeersch et al. |
| 9,318,898 B2 | 4/2016 | John |
| 9,319,855 B2 | 4/2016 | Eaton |
| 9,343,226 B2 | 5/2016 | Esnard-Domerego et al. |
| 9,347,796 B1 | 5/2016 | Rapadas |
| 9,362,986 B2 | 6/2016 | Karaoguz et al. |
| 9,392,545 B2 | 7/2016 | Preiszler et al. |
| 9,414,317 B2 | 8/2016 | Shanmugasundaram et al. |
| 9,419,444 B2 | 8/2016 | Eaton |
| 9,490,653 B2 | 11/2016 | Shevde et al. |
| 9,497,612 B2 | 11/2016 | Linde |
| 9,521,619 B2 | 12/2016 | Balasubramanian et al. |
| 9,543,779 B2 | 1/2017 | Won et al. |
| 9,559,544 B2 | 1/2017 | Jakubowski |
| 9,559,547 B2 | 1/2017 | Muurinen et al. |
| 9,591,582 B1 | 3/2017 | Rabii et al. |
| 9,596,584 B2 | 3/2017 | Hyde et al. |
| 9,668,229 B2 | 5/2017 | Yi et al. |
| 9,680,337 B2 | 6/2017 | Sankar |
| 9,686,757 B1 | 6/2017 | Lee et al. |
| 9,722,771 B2 | 8/2017 | Banowetz et al. |
| 9,736,777 B2 | 8/2017 | Spero et al. |
| 9,787,364 B2 | 10/2017 | Moore et al. |
| 9,813,887 B2 | 11/2017 | Hyde et al. |
| 9,843,917 B2 | 12/2017 | Hyde et al. |
| 9,882,427 B2 | 1/2018 | Leabman et al. |
| 9,887,037 B2 | 2/2018 | Lee et al. |
| 9,913,081 B1 | 3/2018 | Thanayankizil et al. |
| 9,923,408 B2 | 3/2018 | Lee et al. |
| 9,923,603 B2 | 3/2018 | Won et al. |
| 9,924,474 B2 | 3/2018 | Yang et al. |
| 9,953,174 B2 | 4/2018 | Niessen |
| 9,955,420 B2 | 4/2018 | Banerjea |
| 9,973,030 B2 | 5/2018 | Wang |
| 10,004,036 B2 | 6/2018 | Caracas et al. |
| 10,015,744 B2 | 7/2018 | Cherniavsky et al. |
| 10,038,339 B2 | 7/2018 | Sankar |
| 10,104,706 B2 | 10/2018 | John et al. |
| 10,186,893 B2 | 1/2019 | Bell et al. |
| 10,211,685 B2 | 2/2019 | Bell et al. |
| 10,211,686 B2 | 2/2019 | Zeine et al. |
| 10,224,736 B2 | 3/2019 | Schoene et al. |
| 10,224,982 B1 | 3/2019 | Leabman et al. |
| 10,264,527 B2 | 4/2019 | Salomone et al. |
| 10,318,012 B2 | 6/2019 | Tangen et al. |
| 2002/0061744 A1 | 5/2002 | Hamalainen et al. |
| 2002/0183008 A1 | 12/2002 | Menard et al. |
| 2004/0043797 A1 | 3/2004 | Shostak |
| 2005/0085264 A1 | 4/2005 | Matsumura |
| 2005/0281320 A1 | 12/2005 | Neugebauer |
| 2006/0078001 A1 | 4/2006 | Chandra et al. |
| 2007/0036154 A1 | 2/2007 | Lipman |
| 2007/0054622 A1 | 3/2007 | Berkman |
| 2007/0279228 A1 | 12/2007 | Morris et al. |
| 2008/0064449 A1 | 3/2008 | Huang et al. |
| 2009/0161581 A1 | 6/2009 | Kim |
| 2010/0153760 A1 | 6/2010 | Gupta et al. |
| 2010/0268971 A1 | 10/2010 | Poo et al. |
| 2010/0290380 A1 | 11/2010 | Tsai et al. |
| 2010/0302979 A1 | 12/2010 | Reunamaki |
| 2012/0155347 A1 | 6/2012 | Husted et al. |
| 2012/0163261 A1 | 6/2012 | Vedanthanm et al. |
| 2012/0300245 A1 | 11/2012 | Chatierjee et al. |
| 2013/0147605 A1 | 6/2013 | Chang et al. |
| 2013/0285603 A1 | 10/2013 | Zeinstra et al. |
| 2014/0141736 A1 | 5/2014 | Kanno et al. |
| 2014/0159646 A1 | 6/2014 | Sankar et al. |
| 2014/0357309 A1 | 12/2014 | Leabman et al. |
| 2015/0055527 A1 | 2/2015 | Burhan et al. |
| 2015/0123606 A1 | 5/2015 | Tew |
| 2016/0037486 A1 | 2/2016 | Wentzloff et al. |
| 2016/0087485 A1 | 3/2016 | Maeda et al. |
| 2016/0089989 A1 | 3/2016 | Park |
| 2016/0182432 A1 | 6/2016 | De et al. |
| 2016/0241045 A1 | 8/2016 | Leabman |
| 2016/0329751 A1 | 11/2016 | Mach et al. |
| 2016/0347193 A1 | 12/2016 | Caldwell et al. |
| 2017/0018949 A1 | 1/2017 | Pudipeddi et al. |
| 2017/0077754 A1 | 3/2017 | Jeong et al. |
| 2017/0134182 A1 | 5/2017 | Davis et al. |
| 2017/0155270 A1 | 6/2017 | Wang |
| 2017/0251431 A1 | 8/2017 | Croteau et al. |
| 2017/0264141 A1 | 9/2017 | Von Novak, III |
| 2017/0294810 A1 | 10/2017 | Meng et al. |
| 2018/0020410 A1 | 1/2018 | Park |
| 2018/0034506 A1 | 2/2018 | Moore et al. |
| 2018/0048189 A1 | 2/2018 | Park |
| 2018/0115947 A1 | 4/2018 | Kim et al. |
| 2018/0176865 A1 | 6/2018 | Kim et al. |
| 2018/0184435 A1 | 6/2018 | Cariou et al. |
| 2018/0219432 A1 | 8/2018 | Podkamien et al. |
| 2018/0248411 A1 | 8/2018 | Sagi et al. |
| 2018/0270753 A1 | 9/2018 | Recker et al. |
| 2018/0287668 A1 | 10/2018 | Pifferi |
| 2018/0317173 A1 | 11/2018 | Kim et al. |
| 2018/0338293 A1 | 11/2018 | Pisharody et al. |
| 2018/0351369 A1 | 12/2018 | Lee et al. |
| 2018/0375025 A1 | 12/2018 | Bogdanovich |
| 2019/0058360 A1 | 2/2019 | Garbus et al. |
| 2019/0074867 A1 | 3/2019 | Park et al. |
| 2019/0119978 A1 | 4/2019 | Hall et al. |
| 2020/0044491 A1* | 2/2020 | Qiu .................. H02J 50/12 |
| 2020/0227950 A1* | 7/2020 | Lim .................. H02J 50/12 |

* cited by examiner

WIRELESS CHARGING SYSTEMS AND METHODS FOR CONTROLLING THE SAME

BACKGROUND

Embodiments of the present disclosure relate to wireless charging systems.

Wireless charging has been widely used in commercial applications such as for charging smart-phones, smart-watches, wireless earbuds, etc. Typical wireless charging mechanisms include inductive coupled based wireless charging mechanisms and resonant coupled based wireless charging mechanisms. Inductive coupling-based wireless charging mechanisms use the magnetic field to transfer energy from a transmitter coil of a charger to a receiver coil of an electrical device. Resonant coupling-based wireless charging mechanisms use electromagnetic field to transfer energy from the transmitter coil of the charger to the receiver coil of the electrical device. However, in order to delivery enough power from the transmitter coil to receiver coil, the transmitter coil and the receiver coil must be very large or very close to each other, to ensure high coupling coefficient (e.g., at a millimeter lever, such as less than 6 millimeters for inductive coupled based wireless charging). Also, in current charging mechanisms, in order to realize wireless charging, the transmitting device and the receiving device must follow the same wireless charging protocol (e.g., wireless power consortium (WPC QI), power matters alliance (PMA) and Alliance for Wireless Power (A4WP)). The short charging distance and the charging protocol restriction greatly limited the application of wireless charging.

Embodiments of the disclosure address the above problems by an improved wireless charging system that can work at a larger charging distance and is compatible for different types of wireless charging protocols because of its high coupling coefficient.

SUMMARY

Embodiments of wireless charging systems and methods for wirelessly charging electrical loads are disclosed herein.

In one example, a magnetic field transfer circuit (MFCT) includes a first coil and a second coil. The first coil is configured to receive a first magnetic flux transmitted from a transmitter and convert the received magnetic flux to a current. The second coil is configured to transmit a second magnetic flux to a receiver based on the current.

In another example, a method for wireless charging is disclosed. The method includes receiving a first magnetic flux transmitted from a transmitter using a first coil and converting the received magnetic flux to a current. The method further includes transmitting a second magnetic flux to a receiver based on the current using a second coil.

In still another example, a wireless charging system includes a transmitter configured to transmit a first magnetic flux and a magnetic field transfer circuit (MFTC). The MFTC is configured to receive the first magnetic flux from the transmitter using a first coil and convert the received first magnetic flux into a current. The MFTC is further configured to transmit a second magnetic flux to a receiver using a second coil, wherein control information is transferred between the transmitter and the receiver using the MFTC base on the in-band communication between transmitter and first coil in MFTC and the in-band communication between receiver and second coil in MFTC.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
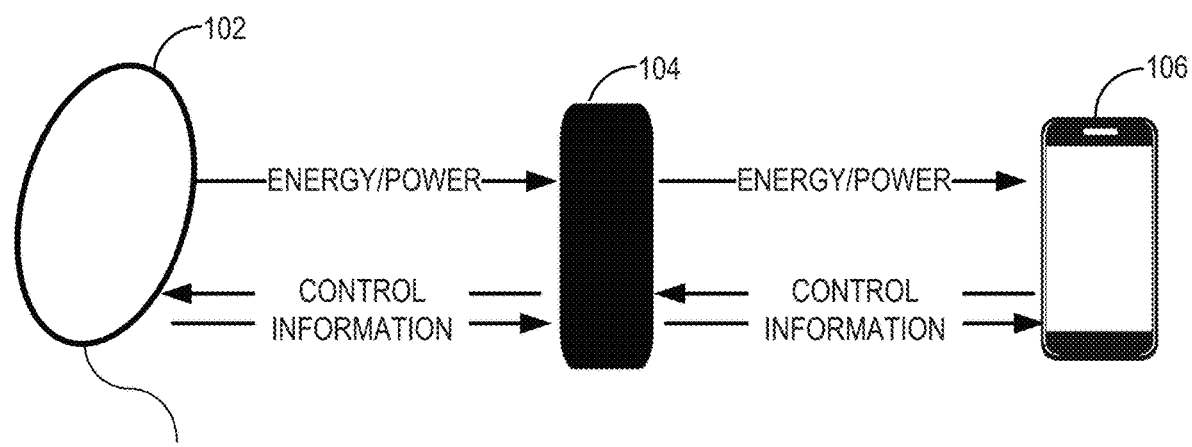
FIG. 1 is a block diagram illustrating an exemplary wireless charging system in accordance with various embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Wireless charging technologies remove wires as a physical link between the transmitter device and the receiver device while transmitting electrical energy. While using a wire to transmit electrical energy (e.g., charging an electrical load) is inconvenient or sometimes even hazardous, eliminating the wires can increase the mobility, convenience, and safety of electrical energy transmission. Wireless charging technologies include inductive coupled wireless charging mechanisms where electrical energy is transferred between a transmitter and a receiver based on magnetic field and resonant coupled wireless charging mechanisms where electrical energy is transmitted between a transmitter and a receiver based on the electromagnetic field.

Inductive coupled wireless charging mechanisms are widely used in commercial applications such as for charging smart-phones, smart-watches, wireless earbuds, etc. In a typical inductive charging system, a transmitter (e.g., a first induction device) uses a first induction coil to create an alternating magnetic field within a charging base, and a receiver (e.g., a second induction device) uses a second induction coil in the device to take electrical energy/power from the magnetic field and converts it back into electric current to charge the battery of the device and/or run the device directly. The efficiency of electrical power transmission is measured by the coupling coefficient of the system. Normally, within a certain range, the higher the coupling coefficient the wireless charging system has, the better the wireless charging system performs. As the coupling coefficient of the wireless charging system depends mostly on how well the receiver receives energy from the magnetic field created by the transmitter (e.g., how much magnetic flux in the magnetic field transmitted/emitted by the transmitter based on its induction coil passes through the induction coil of the receiver), the larger in size and the closer in distance, the higher the coupling coefficient the wireless charging system can achieve.

Moreover, control information such as the amount of electrical power needed to be delivered, the level of voltages to deliver the amount of electrical power, and transmission protocol related functions such as stop charging and foreign objective detection, and fast charging mode activation etc. are transmitted via in-band communication which requires certain level of the coupling coefficient of the wireless charging system. This normally can cause the charging distance between the transmitter and the receiver to be limited to a millimeter level (because the receiving coils on the receiver side normally are small due to practical reasons) and affect the convenience of using the wireless charging system.

As will be disclosed in detail below, among other novel features, wireless charging system including a magnetic field transfer circuit disclosed herein can achieve longer distance wireless charging with a higher coupling coefficient of the wireless charging system and improved compatibility of different wireless charging protocols as a result. In some basic embodiments of the present disclosure, the transmitter may transmit the electrical energy to the magnetic field transfer circuit based on a first magnetic field using a first coil of the magnetic field transfer circuit, and the magnetic field transfer circuit may transmit the received electrical power to the receiver based on a second magnetic field using a second coil of the magnetic field transfer circuit. Among other advantages which will be disclosed below, because the first coil of the magnetic field transfer circuit can be large in size and the second coil of the magnetic field transfer circuit can be placed close to the receiver coil of the receiver, or vice versa where the first coil of the magnetic field transfer circuit can close to the transmitter's coil of the transmitter, and the second coil of the magnetic field transfer circuit can be large in size, the charging distance for having the magnetic field transfer circuit in the wireless charging system can be greatly increased while maintaining certain level of coupling coefficient, even when the distance between transmitter and receiver is large.

Moreover, by electrically coupling passive components such as capacitors of different capacitances (e.g., electrically connecting/coupling capacitors of different capacitances to the magnetic field transfer circuit or electrically connecting/ coupling different number of capacitors of the same capacitances based on different circuit designs such as in series, in parallels or in series-parallels), the applicable charging distance for the wireless charging system can be managed for the reason that at the same charging distance, the larger the capacitance of the magnetic field transfer circuit is, the lower the coupling coefficient of the wireless charging system is. This can greatly broaden the application of the wireless charging system by allowing users to manually or automatically adjust the applicable coupling coefficient to accommodate different wireless charging distance range. Moreover, the adjustment of coupling coefficient may also be embodied via design of the magnetic field transfer circuit. In some other embodiments, the magnetic field transfer circuit may simultaneously charge more than one receiver (e.g., electrical loads like smart phones, smart watches, earbuds, lamps, computers, monitors, TVs, cameras, power tools and other electrical devices). For example, besides the first coil for receiving the electrical energy from the transmitter, the magnetic field transfer circuit may include a second coil, a third coil, or even more coils for transmitting electrical power to different receivers. Similar to the charging one receiver scenario, by individually or collectively adjust the capacitance of the circuit connected to each of the charging coils (e.g., the coil facing the receiver) based on different circuit designs, the magnetic field transfer circuit may realize simultaneously charging different receivers at different charging distances. For example, besides using multiple coils to charge multiple receivers simultaneously, usage of coil selection circuit with multiple coil (e.g., a switch and a capacitor in series with each coil) may be used to enlarge the misalignment tolerance of receiver. This could further increase the convenience of using the wireless charging system disclosed herein.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 is a block diagram illustrating an exemplary wireless charging system 100 in accordance with an embodiment. In FIG. 1, wireless charging system 100 may include a charging pad 102, a magnetic field transfer circuit 104, and an electrical load 106. Charging pad 102 may be any suitable device that can provide electrical power and can use the electrical power to generate a changing/alternating magnetic field. In some embodiments, charging pad 102 among other things may include a power source (not shown), a transmitter coil configured to generate the changing/alternating magnetic field using the electrical power received from the power source and a transmitter circuit configured to electrically connect the power source and the transmitter coil. In some embodiments, the power source may be a battery such as an alkaline battery, a lithium-ion battery, or any other type of battery that is able to provide operation voltage. The batteries may be primary batteries that are not rechargeable or secondary batteries that are rechargeable. In some other embodiments, the power source may be an external power source connected to charging pad 102 through a port (not shown). For example, the port may be a USB port, a mini-USB port, a micro-USB port, a USB-C port, or other types of suitable ports that provide electrical power to the transmitter circuit for the purpose of generating a changing/alternating magnetic field. In some embodiments, charging pad 102 may include any suitable charging device that can provide electrical power to the transmitting coil for the purpose of transmitting electrical power to electrical load 106. For example, charging pad 102 may include a simple charger (e.g., a constant DC or pulsed DC power source, an AC-powered battery charger, etc.), a fast charger, a three-stage charger, an induction-powered charger, an intelligent charger (e.g., charger with a chip for charging smart batteries), a motion-powered charger, a pulse charger, a solar charger, a timer-based charger, a USB-based charger, an universal battery charger, a trickle charger, a power supply, a power adapter or any other suitable device. The transmitter coil may include a wire (e.g., a copper wire or a Litz wire) wound into a coil, a spiral or a helix shape that may generate a changing/alternating magnetic field when current flows through it. In some embodiments, the transmitter coil may include a ferrite core disposed at the center of the wire wound coil or helix, or a ferrite plate disposed on one side of the spiral wire. It is contemplated that the transmitter coil may be any type and any shape of induction coil that is suitable for generating/emitting magnetic flux for transmitting the electrical energy to electrical load 106.

Figure 12A:
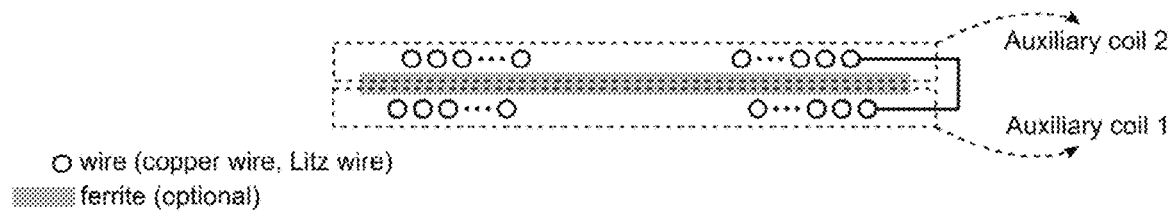
FIG. 12A is a detailed block diagram illustrating an exemplary magnetic field transfer circuit with the first coil and the second coil sharing a ferrite plate in accordance with an embodiment.
Figure 12B:
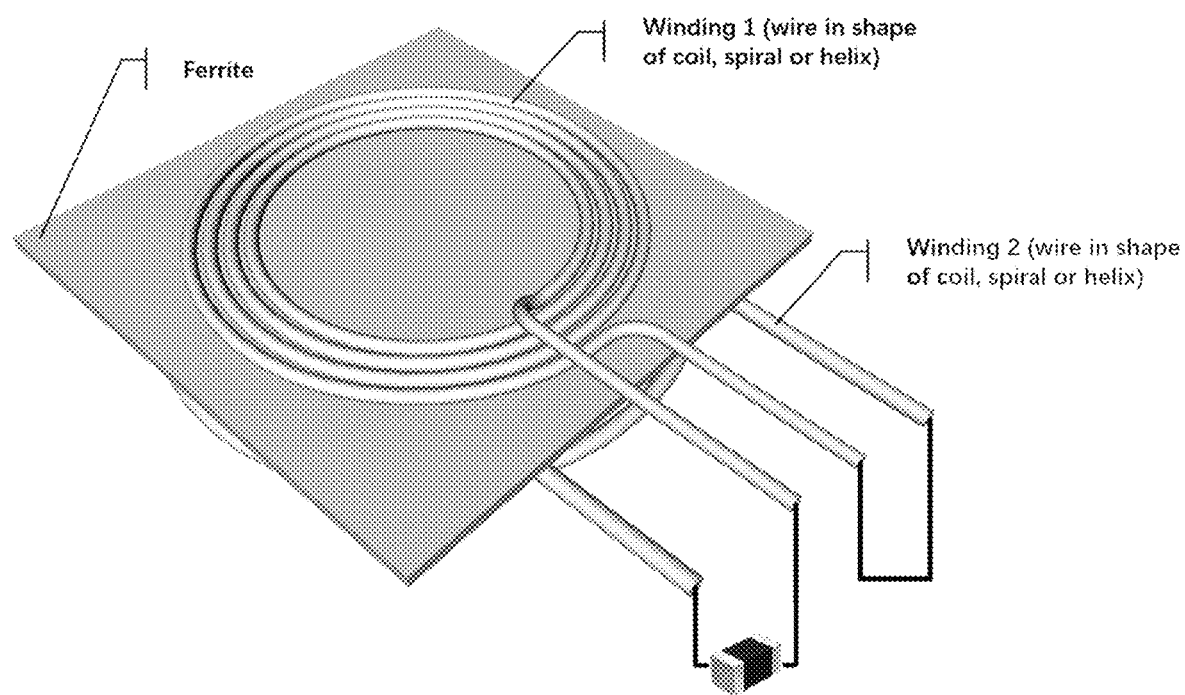
FIG. 12B is a 3D model illustrating an exemplary magnetic field transfer circuit with the first coil and the second coil sharing a ferrite plate in accordance with an embodiment.

Magnetic field transfer circuit 104 may be configured to receive the electrical power from charging pad 102 and retransmit the received electrical power to electrical load 106. In some embodiments, magnetic field transfer circuit 104 may include among other things at least a first coil (e.g., a receiving coil) configured to take the power stored in the magnetic field created by charging pad 102, a second coil (e.g., a transmitting coil) configured to generate another changing/alternating magnetic field and a connecting circuit configured to electrically connect/couple the first and the second coil. In some embodiments, the first coil and the second coil may include a wire (e.g., a copper wire or a Litz wire) wound into a coil, a helix or a spiral shape that may generate a changing/alternating magnetic field when current flows through it. In some embodiments, the first and/or the second coil may include a ferrite core disposed at the center of the wire wound coil or helix, or a ferrite plate disposed on one side of the spiral wire. In some embodiments, the first coil which is configured to take the energy stored in the magnetic field and convert it into the current may have a similar structure as the second coil which is configured to reversely convert the electrical power received to the energy stored in another magnetic field. In some embodiments, the first and the second coil may be wound in a spiral shape and may include a ferrite plate. For example, each one of the first and the second coil may individually have a ferrite, or the first and the second coil may share a ferrite plate. For example, as illustrated in FIGS. 12A and 12B, the wire spiral of each of the first coil and the second coil may be disposed at the two sides of the ferrite plate. FIG. 12A is a detailed block diagram illustrating an exemplary magnetic field transfer circuit with the first coil and the second coil sharing a ferrite plate in accordance with an embodiment. FIG. 12B is a 3D model illustrating an exemplary magnetic field transfer circuit with the first coil and the second coil sharing a ferrite plate in accordance with an embodiment.

In some embodiments, charging pad 102 and electrical load 106 may additionally include in-band modulation/demodulation (e.g., one or more processors configured to demodulate/extract instructions from control information and/or modulate/code instructions to generate control information) and may transmit to and/or receive from each other control information using an in-band communication based on modulation of a current or voltage of magnetic field transfer circuit 104. The in-band modulation/demodulation may include a microprocessor, a digital signal processor (DSP), a microcontroller, a field programmable gate array (FPGA), a system on chip (SoC) and/or other suitable devices or chips capable of processing the control information. For example, electrical load 106 may detect the delivered voltage, compares it to the target value, generate the control information based on the relationship between the delivered voltage level and the target voltage level, and send the control information to charging pad 102 (e.g., using an in-band modulation). Charging pad 102 may receive the control information and demodulate/extract the instructions encoded (e.g., using in-band demodulation) and then regulate the magnetic field strength and the receiver voltage level based on the instructions extracted. In some embodiments, the control information may also include other functions such as stop charging, foreign objective detection, fast charging mode activation, etc.

In some embodiments, the connecting circuit of magnetic field transfer circuit 104 may also include one or more passive components such as inductors and/or capacitors electrically connected/coupled with the first and the second coil of magnetic field transfer circuit 104 in parallels, in series or in a combination of parallels and series to adjust the gain of magnetic field transfer circuit 104 and thus adjust the coupling coefficient of the wireless charging system (will be disclosed in detail below). For example, magnetic field transfer circuit 104 may be adjusted to have lower capacitance when the coupling coefficient of magnetic field transfer circuit 104 is required to be high (e.g., when the charging distance is long).

In some other embodiments, magnetic field transfer circuit 104 may include switches to control the number of passive components electrically connected/coupled with the first coil and the second coil of magnetic field transfer circuit 104 (e.g., connected in series with the passive component to be controlled) to accommodate for different charging distances. For example, under certain charging distance magnetic field transfer circuit 104 may be electrically connect/couple with a capacitor of larger capacitance by turning on a switch connected in series with the capacitor of larger capacitance and cut off connections with capacitors of smaller capacitance by turning off the switches connected in series with those capacitors. Under another charging distance, the switch connected in series with the capacitor of smaller capacitance is turned on and the connections with capacitors of larger capacitance is cut off by turning off the switches connected in series with those capacitors. This switch control may be embodied manually or automatically, via magnetic field transfer circuit 104.

In some further embodiments, magnetic field transfer circuit 104 may include more than two coils (e.g., 3, 4, 5 or even more) for charging more than one electrical load 106 at the same time. Also, each of the charging coil (e.g., the coil facing the electrical loads) may be individually or collectively connected to passive components for individually or collectively adjusting the charging distances. It is known to a person skilled in the art that the number of the charging coils and the manner of connecting the passive components to the coils are not mean to be limited to the embodiments disclosed below.

Figure 10A:
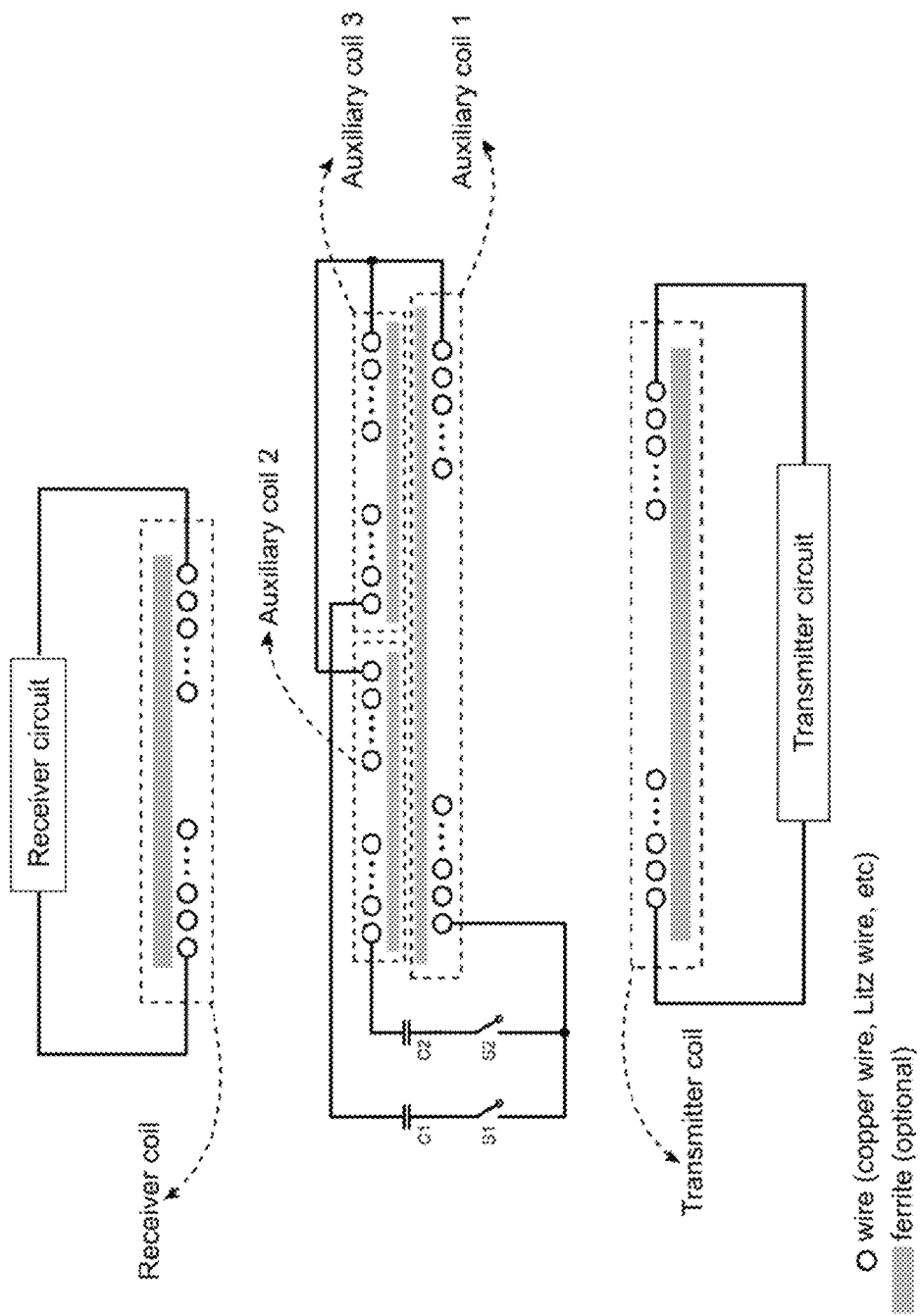
FIGS. 10A and 10B are block diagrams illustrating exemplary magnetic field transfer circuits with multiple coil selection options in accordance with various embodiments.
Figure 10B:
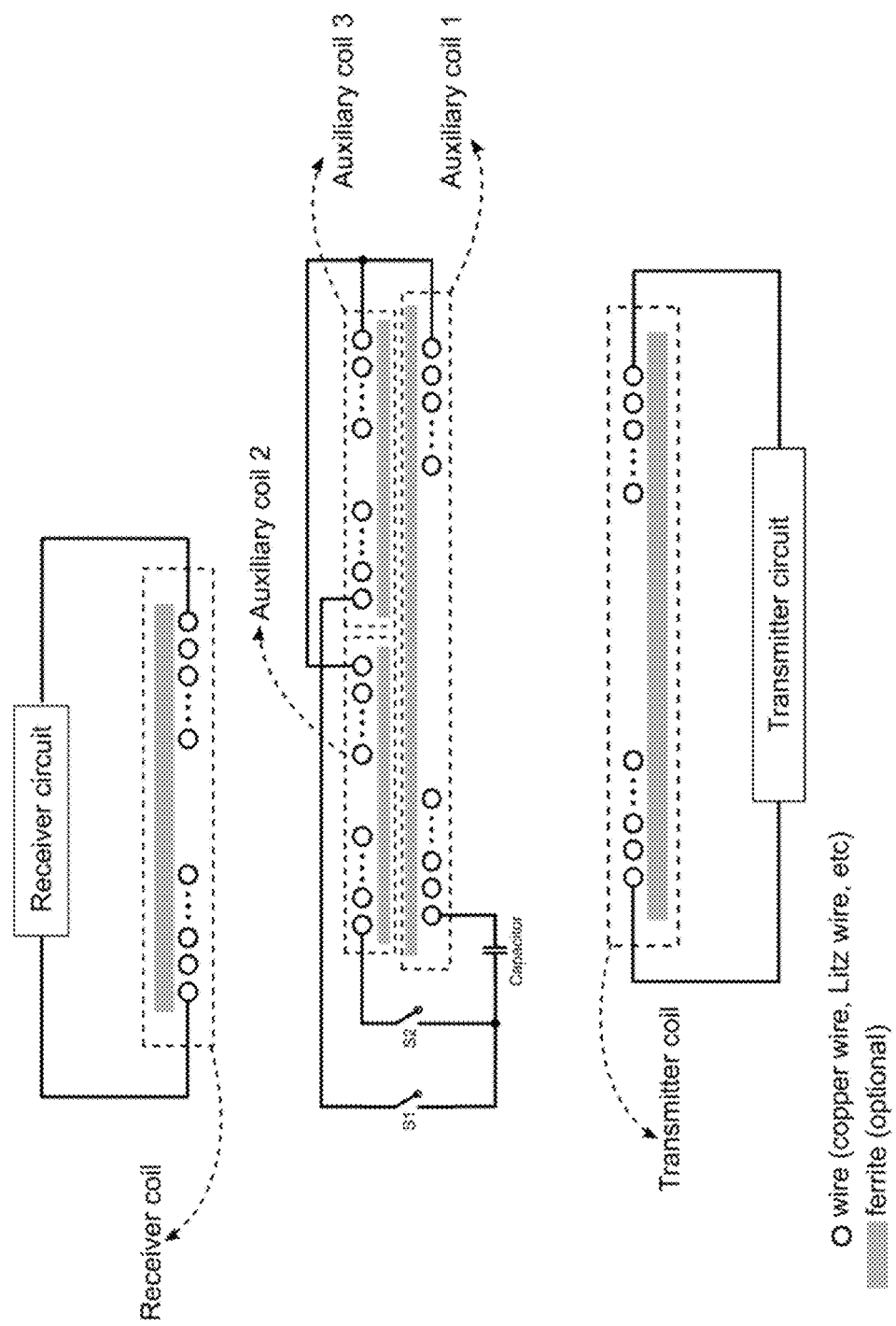

In still another embodiment, in addition to having more than one auxiliary coil facing the receivers, magnetic field transfer circuit 104 may include auxiliary coil selection options as will be illustrated in FIGS. 10A and 10B, to increase the misalignment tolerance of magnetic field transfer circuit 104. For example, magnetic field transfer circuit 104 may include two capacitors and two switches that may be respectively connected in series with the two auxiliary coils facing the receiver. When the receiver is placed on one of auxiliary coils, the switch connected in series with the corresponding auxiliary coil will be turned on and the other switch will be turned off. Consequently, the corresponding auxiliary coil will be working and the other one would be in idle. In another example, two switches may be respectively connected in series with the auxiliary coils facing the receiver, and both of which are collectively connected to a common capacitor. Similar to the prior example, when the receiver is placed on one of auxiliary coils, the switch connected in series with the corresponding auxiliary coil will be turned on and the other switch will be turned off. Thus, the corresponding auxiliary coil will be working and the other one would be in idle. It is contemplated that the number of auxiliary coils facing the receiver is not limited to two. There can be 3, 4, 5, or more auxiliary coils facing the receiver to further increase the misalignment tolerance of magnetic field transfer circuit 104.

Electrical load 106 may be, but is not limited to, a handheld device (e.g., dumb or smart phone, tablet, etc.), a wearable device (e.g., eyeglasses, wrist watch, etc.), a radio, a music player, an electronic instrument, an automobile control station, a gaming console, a television set, a laptop computer, a desktop computer, a netbook computer, a media center, a set-top box, a global positioning system (GPS), or any other suitable devices that consume electric power. Electrical load 106 may include among other things, a receiver coil, a battery and a receiver circuit configured to electrically connect the receiver coil and the battery. The receiver coil may have a similar structure as the transmitter coil that could reversely convert the energy stored in the magnetic field into the current.

Figure 2:
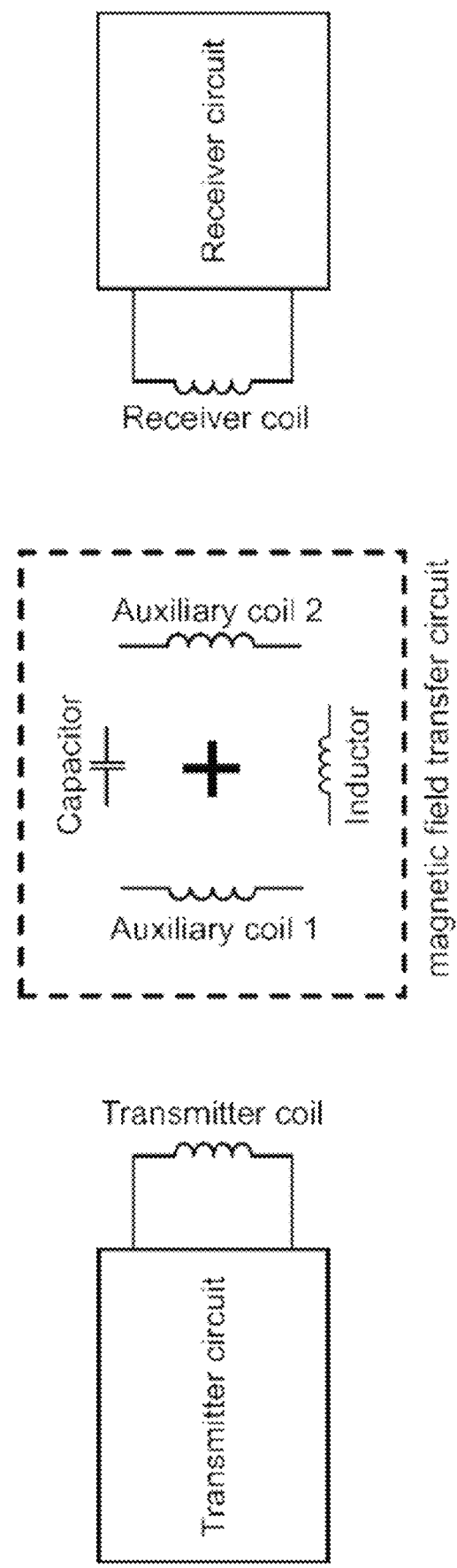
FIG. 2 is a detailed block diagram of the exemplary wireless audio system in accordance with various embodiments.

FIG. 2 is a detailed block diagram of the exemplary wireless audio system 100 in FIG. 1, in accordance with an embodiment. Charging pad 102 in this example includes a transmitter circuit 202 and a transmitter coil 204. Transmitter circuit 202 may be configured to electrically connect transmitter coil 204 with a power source. For example, transmitter circuit 202 may be wires connecting electrical components (e.g., the power source and transmitter coil 204), printed circuit printed on a printed circuit board (PCB), an integrated circuit where the electrical components are formed on the same substrate (e.g., a silicon or gallium arsenide substrate), analog circuit, digital circuit or a mixed-signal circuit. Transmitter coil 204 may be configured to generate a changing/alternating magnetic field using the electrical power received from the power source. For example, transmitter coil 204 may include an insulated wire wound into a coil a helix or a spiral that may store energy in a magnetic field when current flows through. In some embodiments, the transmitter coil may include a ferrite core disposed at the center of the wire wound coil or helix, or a ferrite plate disposed at a surface of the spiral coil. It is contemplated that transmitter coil 204 may be any type of induction coil suitable for generating/emitting magnetic flux for transmitting the electrical energy to electrical load 106 when current flows through it.

Magnetic field transfer circuit 104 in this example may include a first coil 206, a second coil 208, and a connecting circuit (not shown). First and second coils 206 and 208 may have a similar structure as transmitter coil 204 such that energy can be transmitted through magnetic field or electromagnetic field. The connecting circuit in some embodiments may include passive components such as capacitor 210 and inductor 212 configured to adjust the coefficient of using the magnetic field transfer circuit 104. For example, capacitor 210 may include more than one capacitor electrically connected in series, in parallels, or in series-parallels, and inductor 212 may include more than one inductor electrically connected in series, in parallels, or in series-parallels as well. By designing the connecting circuit to adjust the number of the electrically connected passive components (e.g., capacitor 210 and/or inductor 212) between first coil 206 and second coil 208, the capacitance of connecting circuit can be adjusted (will be disclosed in detail below). Thus, the gain of magnetic field transfer circuit 104 may be adjusted accordingly. For example, the larger the capacitance of the connecting circuit is, the smaller gain magnetic field transfer circuit 104 may have. By adjusting the gain of magnetic field transfer circuit 104, the coupling coefficient may be adjusted to protect the electric circuits of charging pad 102, magnetic field transfer circuit 104 and receiver 106.

Electrical load 106 in this example may include a receiver coil 214, a receiver circuit 216 and an electrical load (e.g., a battery or a component directly consumes electric energy). Receiver coil 214 may be configured to receive the power stored in the magnetic field generated by second coil 208 of magnetic field transfer circuit 104. For example, receiver coil 214 may include an insulated wire wound into a coil, a helix or spiral that may receive and convert the energy stored in a magnetic field into current flows through it.

Figure 3:
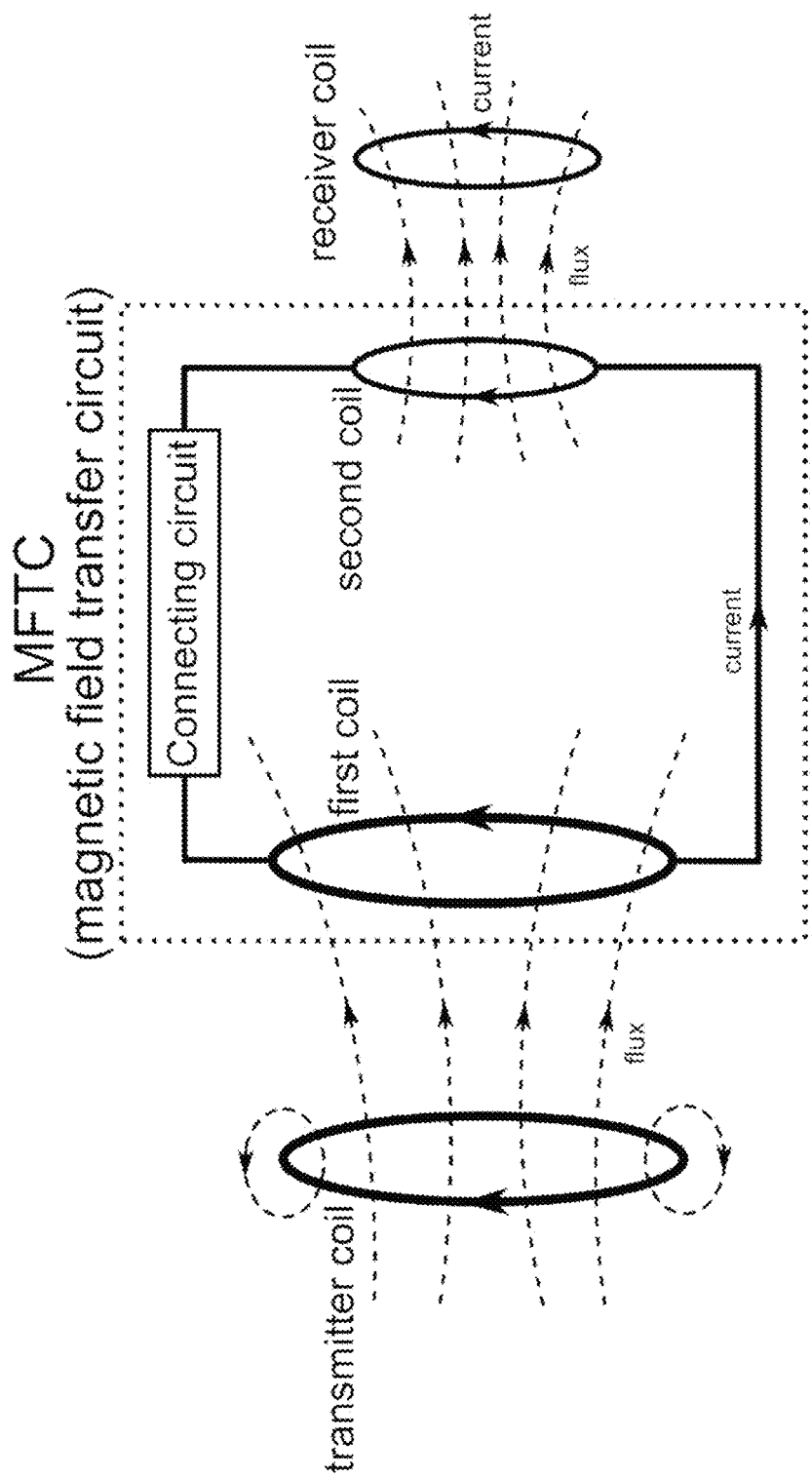
FIG. 3 is a schematic diagram illustrating an exemplary magnetic field transfer circuit in accordance with an embodiment.

FIG. 3 is a schematic diagram illustrating an exemplary magnetic field transfer circuit 104 in accordance with an embodiment. As illustrated in FIG. 3, magnetic field transfer circuit 104 may include two coils where a first coil is facing the transmitter coil of charging pad 102 and a second coil is facing the receiver coil of electrical load 106. Magnetic field transfer circuit 104 may capture the magnetic flux transmitted by the transmitter coil of charging pad 102 using the first coil, convert a first magnetic field to electric field in the winding/wire (this electric field is also named as current), use a connecting circuit to transmit the electric power to the second coil and use the second coil to generate a second changing/alternating magnetic field and transmit the power to electrical load 106 through the flux in the second magnetic field. The power "transmission efficiency between the first coil and the second coil may be close to 100%, and thus, very little energy waste may be caused within magnetic field transfer circuit 104.

Figure 4A:
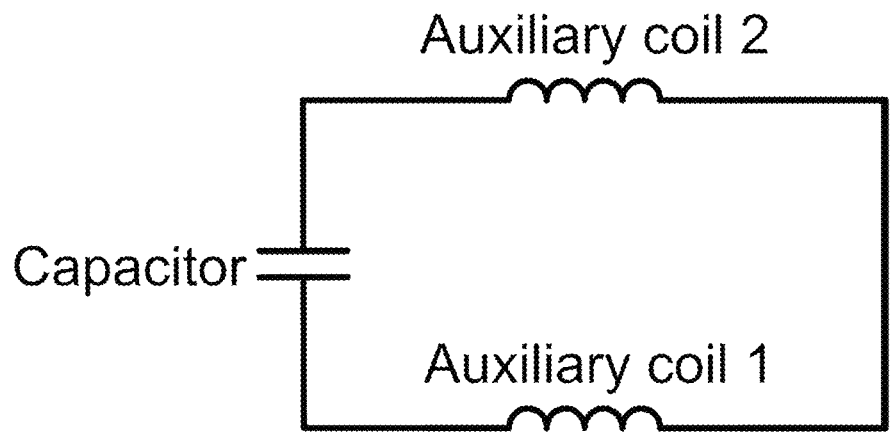
FIGS. 4A and 4B are detailed block diagrams illustrating exemplary magnetic field transfer circuits with one capacitor in accordance with various embodiments.
Figure 4B:
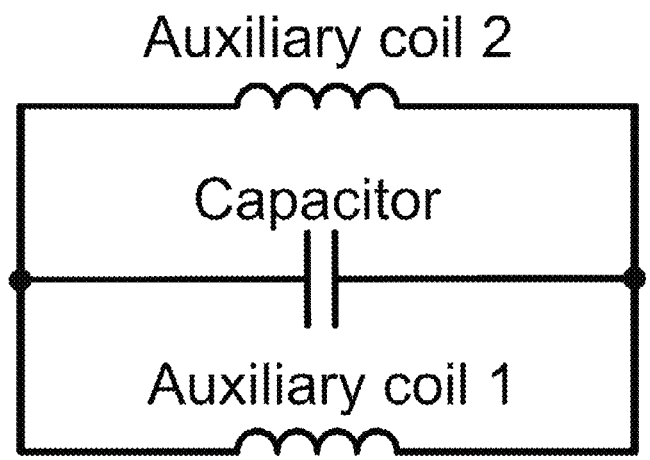

FIGS. 4A and 4B are detailed block diagrams illustrating exemplary magnetic field transfer circuits with one capacitor in accordance with various embodiments. As illustrated in FIGS. 4A and 4B, magnetic field transfer circuit 104 may include passive components such as a capacitor electrically connected to the first coil (e.g., auxiliary coil 1) and the second coil (e.g., auxiliary coil 2) in series or in parallel to transfer magnetic field from the first coil to the second coil as well as adjust the gain of magnetic field transfer circuit 104. For example, as illustrated in FIG. 4A, the capacitor may be connected in series with the two coils or, as illustrated in FIG. 4B, the capacitor may be connected in parallel with the two coils. By using capacitors of different capacitance, the current through the two coils may be controlled and thus the gain and the coupling coefficient can be further controlled accordingly. For example, when magnetic field transfer circuit 104 is used for a longer distance wireless charging, a capacitor of smaller capacitance may be used for increasing the coupling coefficient. On the other hand, when the wireless charging system is used for a shorter distance wireless charging, a capacitor of larger capacitance may be used to lower the coupling coefficient. By controlling the coupling coefficient to be within a proper range (e.g., from 0.1 to 0.6), the voltage and the current on the transmitter side (e.g., charging pad 102) and the receiver side (e.g., electrical load 106) may be controlled (e.g., not too high) and thus, the circuit and the components within the wireless charging system may be protected.

Figure 5A:
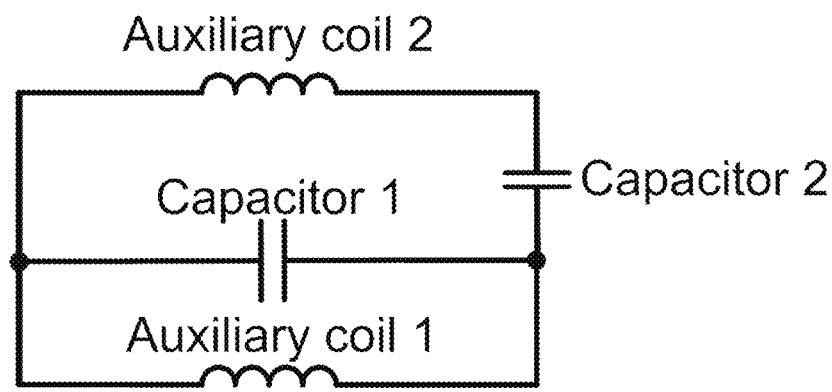
FIGS. 5A and 5B are detailed block diagrams illustrating exemplary magnetic field transfer circuits with two capacitors in accordance with various embodiments.
Figure 5B:
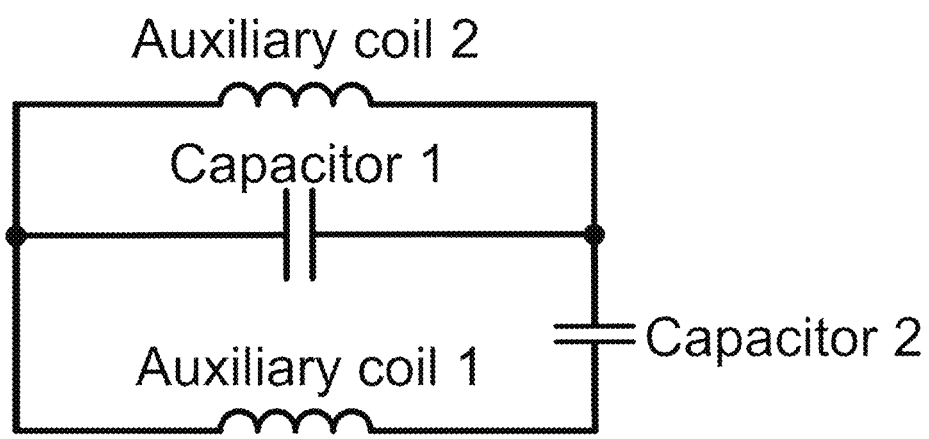

FIGS. 5A and 5B are detailed block diagrams illustrating exemplary magnetic field transfer circuits with two capacitors in accordance with various embodiments. In some embodiments, magnetic field transfer circuit 104 may have two capacitors. One of the capacitors connected in series with the first coil (e.g., auxiliary coil 1) may be used for adjusting the inductance of one of the coils, and the other one of the capacitor may be used for controlling the gain of magnetic field transfer circuit 104, similar to the capacitor illustrated in FIG. 4B. For example, as illustrated in FIG. 5A, capacitor 2 may be used for adjusting the inductance of the second coil (e.g., lower the inductance of auxiliary coil 2) and capacitor 1 may be configured to control the gain of magnetic field transfer circuit 104, similar to the capacitor illustrated in FIG. 4B. As illustrated in FIG. 5B, capacitor 2 may be used for adjusting the inductance of the first coil (e.g., lower the inductance of auxiliary coil 2).

The energy generated by an inductor can be calculated as:

$$E = \frac{1}{2} L I^2 \quad (1).$$

Because one of the coils may have significantly larger inductance than the other coil of magnetic field transfer circuit 104, for example, auxiliary coil 1 is of 100 millihenry and auxiliary coil 2 is of 10 millihenries, using a capacitor connected in series with the coil with significantly larger inductance as illustrated in FIG. 5A may lower the inductance of the coil with significantly larger inductance (e.g., lower the inductance of auxiliary coil 1 to 20 millihenry) to a comparable level as the other coil before coupling the two coil using the other capacitor. Because the two coils share the same current, if the inductance of one coil is significantly larger than the other one (e.g., 10 times larger), the efficiency of energy transmission between the two coils would be impractically reduced.

Figures 6A, 6B:
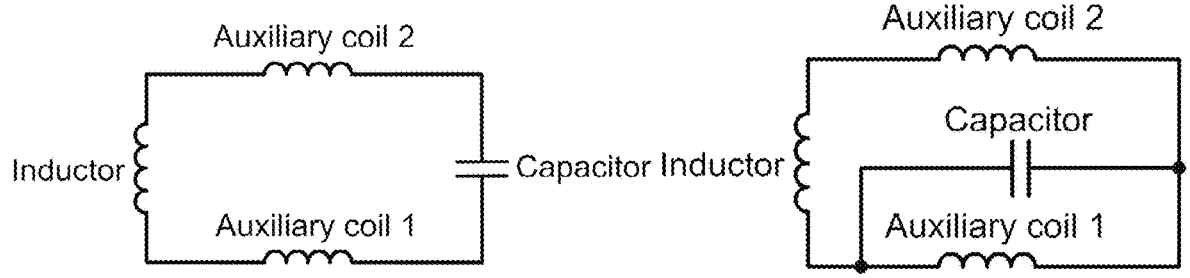
FIGS. 6A-6E are detailed block diagrams illustrating exemplary magnetic field transfer circuits with a capacitor and an inductor in accordance with various embodiments.
Figures 6C, 6D:
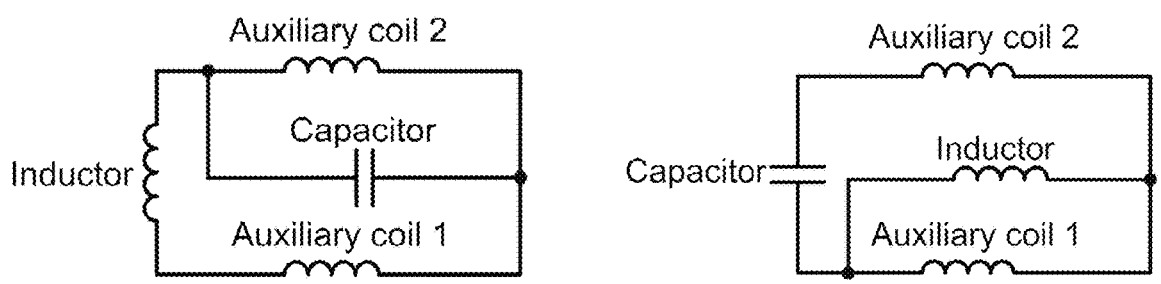
Figure 6E:
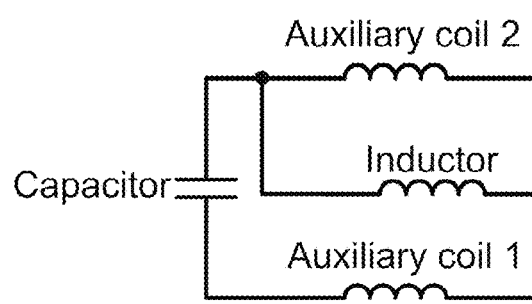

FIGS. 6A-6E are detailed block diagrams illustrating exemplary magnetic field transfer circuits with a capacitor and an inductor in accordance with various embodiments. In some embodiments, as illustrated in FIGS. 6A-6E, magnetic field transfer circuit 104 may include an inductor and a capacitor to adjust the inductance of the coils and the gain of magnetic field transfer circuit 104. For example, the inductor and the capacitor may be connected to the auxiliary coil 1 and auxiliary coil 2 in series as illustrated in FIG. 6A, the capacitor may also be connected in parallel with auxiliary coil 2, and then in series with auxiliary coil 1 and the inductor as illustrated in FIG. 6B, the inductor may further be connected in parallel with auxiliary coil 1, and then in series with auxiliary coil 2, and the capacitor, the inductor may as well be connected in parallel with auxiliary coil 2, and then in series with auxiliary coil 1 and the capacitor. As opposite of capacitor usage, usage of inductor may increase the inductance of the coil with significantly less inductance. Similar with FIGS. 5A and 5B, utilizing capacitor and inductor may balance the inductance of the two coils and regulate the gain of magnetic field transfer circuit 104.

Figure 7:
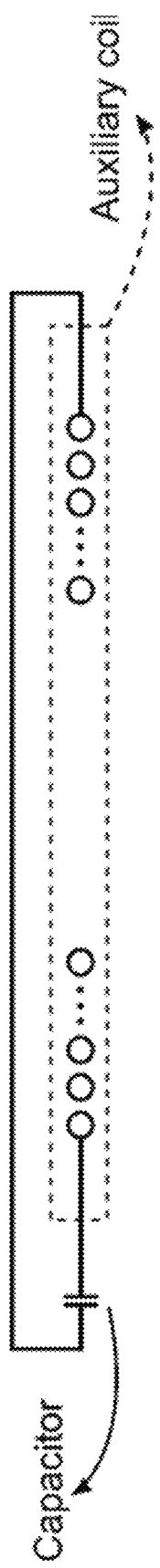
FIG. 7 is a detailed block diagram illustrating an exemplary magnetic field transfer circuit with a capacitor and a coil in accordance with an embodiment.

FIG. 7 is a detailed block diagram illustrating an exemplary magnetic field transfer circuit with a capacitor and a coil accordance with an embodiment. In some embodiments, magnetic field transfer circuit 104 may only have one auxiliary coil as illustrated in FIG. 7. The capacitor is connected to the two terminals of the auxiliary coil. The only one coil may be configured to act both as a receiving coil (e.g., receive flux from charging pad 102) and a transmitting coil (e.g., generate flux for electrical load 106 to receive).

Figure 8:
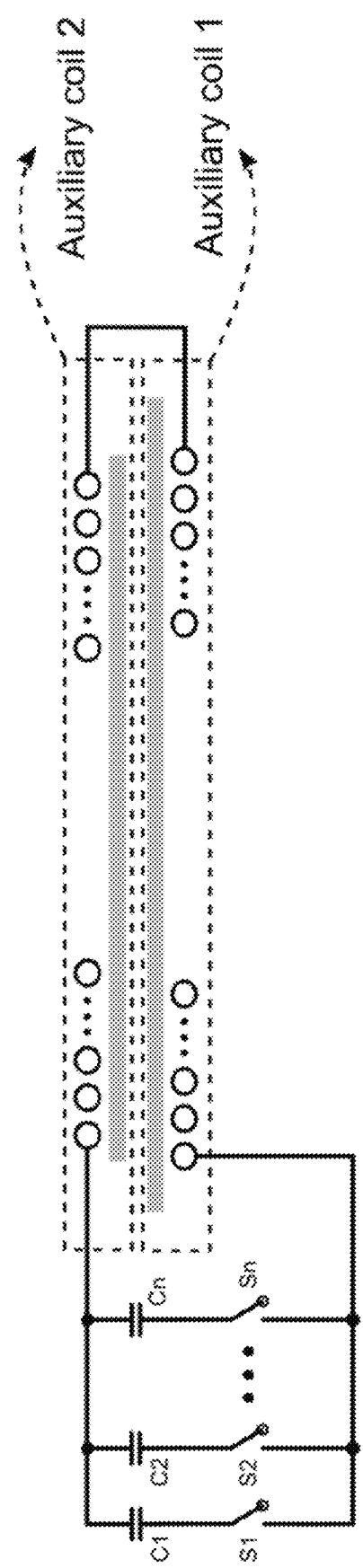
FIG. 8 is a block diagram illustrating an exemplary magnetic field transfer circuit with multiple connection options in accordance with an embodiment.

FIG. 8 is a block diagram illustrating an exemplary magnetic field transfer circuit with multiple connection options in accordance with an embodiment. In order to adjust the charging distance, multiple connection methods can be integrated into magnetic field transfer circuit 104. For example, as illustrated in FIG. 8, magnetic field transfer circuit 104 may include several branches connected in parallel with a switch and a capacitor connected in series on each of the branches. In some embodiments, the switches may be a semiconductor device (e.g., metal-oxide-semiconductor field-effect (MOSFET) transistors, insulated-gate bipolar transistors (IGBT), bipolar junction transistor (BJT), silicon controlled rectifier (SCR), etc.) or mechanical devices (e.g., relays, buttons, keys, etc.).

The applicable charging distance may be adjusted by connecting different capacitors to the two coils. For example, when charging for different distances, one or more capacitors may be switched into the circuit by turning on the corresponding switches, while the other switches may be turned off. By doing so, the gain of magnetic field transfer circuit 104 may be changed and the power level delivered to the receiver may be maintained in a correct range.

Figure 9A:
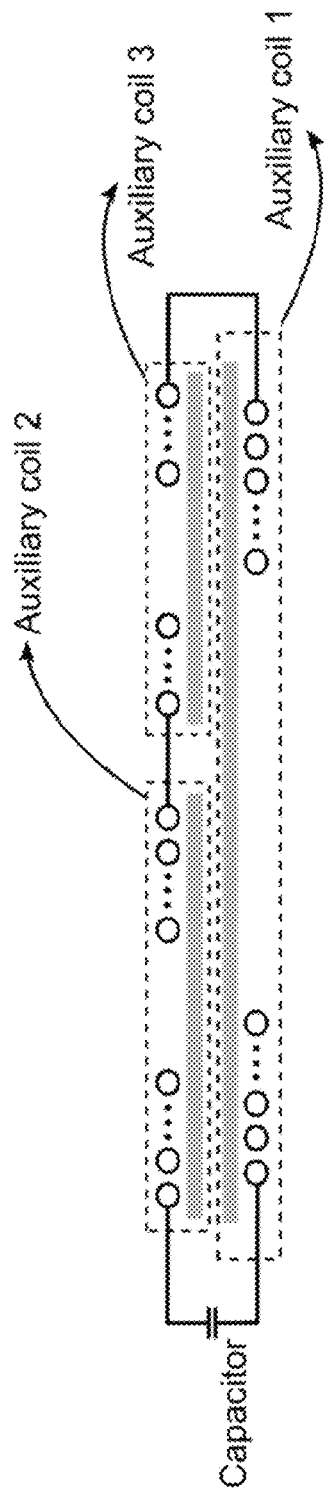
FIGS. 9A-9D are block diagrams illustrating exemplary magnetic field transfer circuits with two or more auxiliary coils in accordance with various embodiments.
Figure 9B:
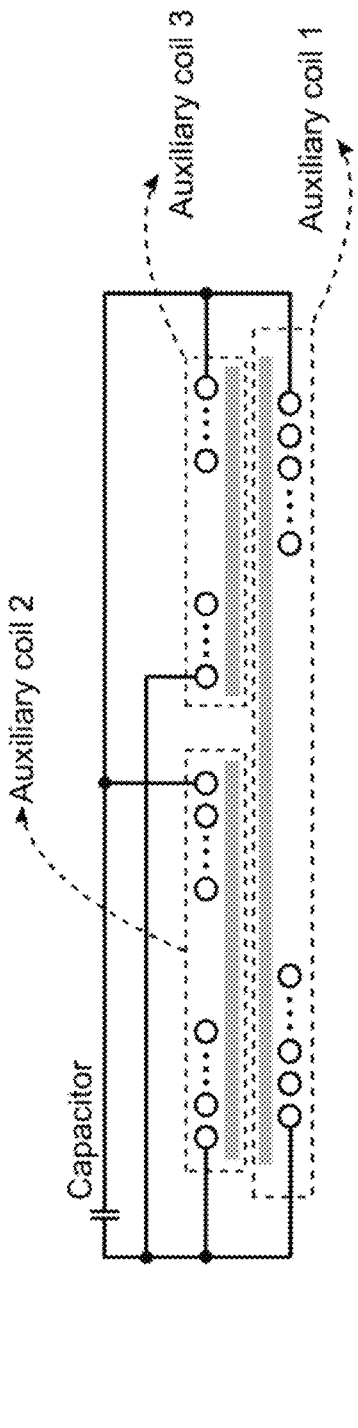
Figure 9C:
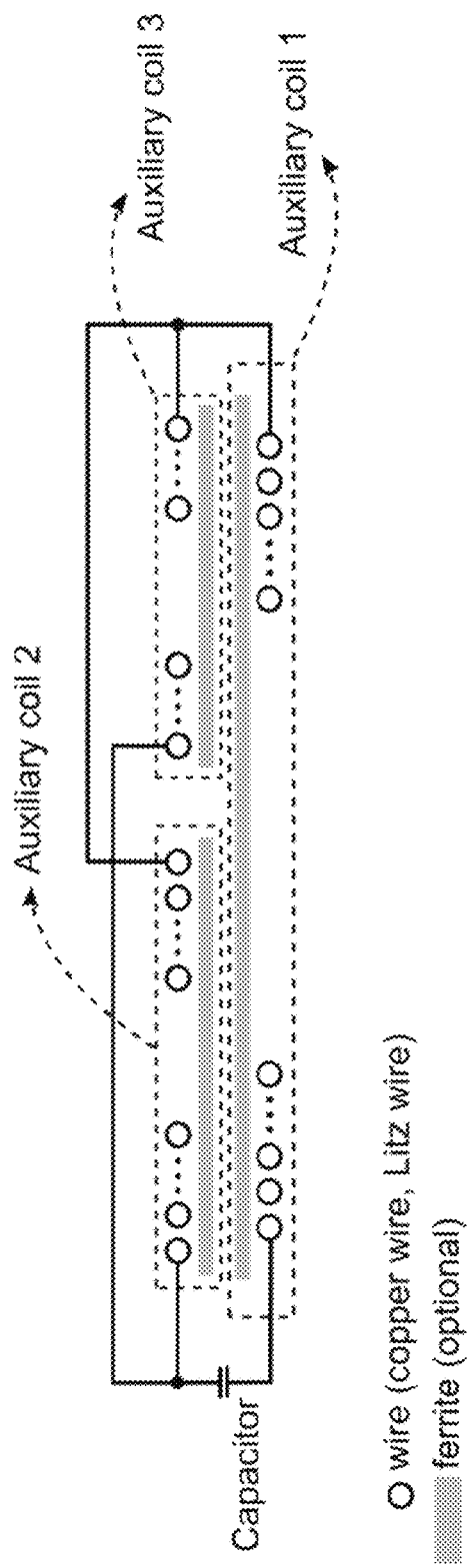
Figure 9D:
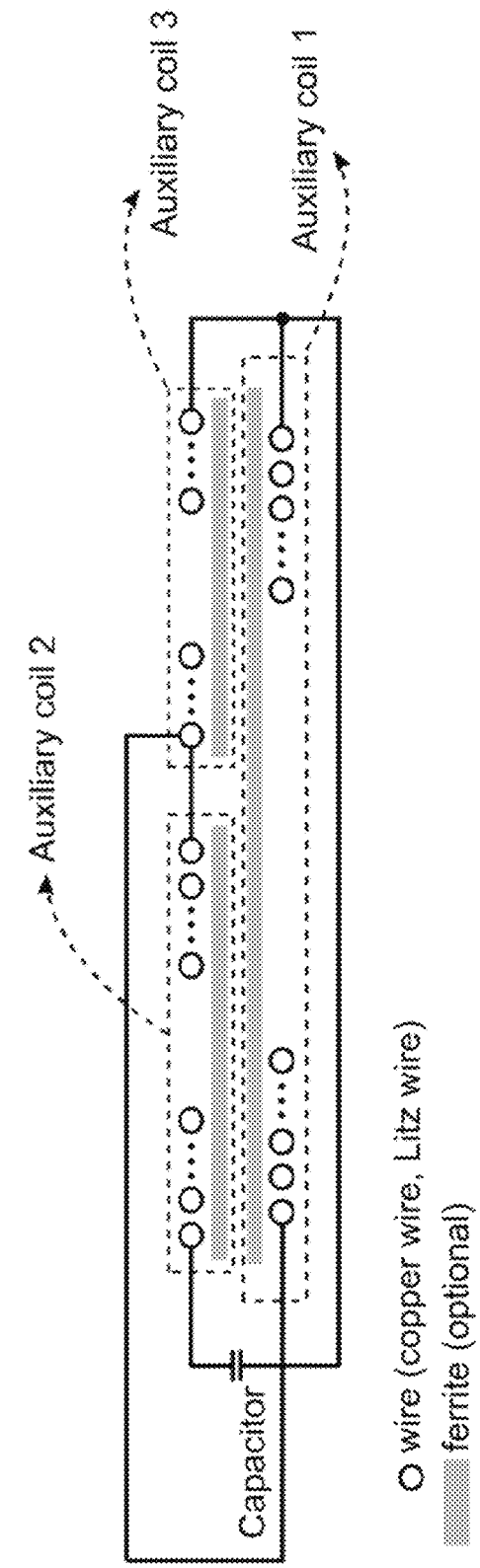

FIGS. 9A-9D are block diagrams illustrating exemplary magnetic field transfer circuits with two or more auxiliary coils in accordance with various embodiments. In some embodiments, magnetic field transfer circuit 104 may include more than one receiving auxiliary coils (e.g., the coil facing the electrical load) so that magnetic field transfer circuit 104 may provide electric power to more than one electrical load at the same time. For example, the two auxiliary coils on the electrical load side (e.g., auxiliary coil 2 and auxiliary coil 3) may be connected in series as illustrated in FIG. 9A, in parallel as illustrated in FIG. 9B, in series-parallel as illustrated in FIG. 9C, in parallel-series as illustrated in FIGS. 9D and 9E. It is understood that the number of auxiliary coils facing the receivers may not be limited to two, and the connecting circuit of all the coils is not limited to only one capacitor. Similar with FIG. 5 and FIG. 6, multiple passive components (capacitors and inductors) may be used to connect the coils of magnetic field transfer circuit.

In some embodiments, in addition to having more than one auxiliary coil facing the receivers, magnetic field transfer circuit 104 may be designed to include auxiliary coil selection options as illustrated in FIGS. 10A and 10B to increase the misalignment tolerance of magnetic field transfer circuit 104. For example, as illustrated in FIG. 10A, where two capacitors and two switches (e.g., capacitor C1 and switch 51, and capacitor C2 and switch S2) are respectively connected in series with auxiliary coil 2 and auxiliary coil 3 as connecting circuits. When the receiver is placed on one of auxiliary coil 2 or auxiliary 3, the switch connected in series with the corresponding auxiliary coil will be turned on and the other switch will be turned off. Consequently, the corresponding auxiliary coil will be working and the other one would be in idle. In another example, as illustrated in FIG. 10B, two switches are respectively connected in series with auxiliary coil 2 and auxiliary coil 3, and both of which are collectively connected to a common capacitor to build the connecting circuits. Similar to the prior example, when the receiver is placed on one of auxiliary coil 2 or auxiliary 3, the switch connected in series with the corresponding auxiliary coil will be turned on and the other switch will be turned off. Thus, the corresponding auxiliary coil will be working and the other one would be in idle. In both examples, the receiver can be place on either facing auxiliary coil 2 or auxiliary 3. This may increase the misalignment tolerance of the receiver which will further increase the user experience. It is contemplated that the number of auxiliary coils facing the receiver is not limited to two. There can be 3, 4, 5, or more auxiliary coils facing the receiver connected in the manner illustrated in FIGS. 10A and/or 10B to further increase the misalignment tolerance of magnetic field transfer circuit 104.

Figure 11:
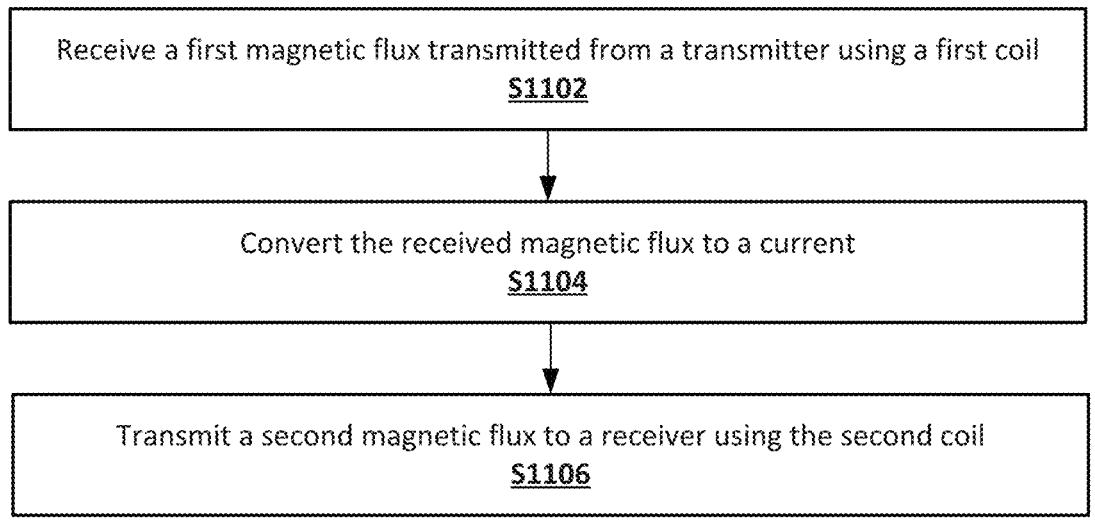
FIG. 11 is a flow chart illustrating an exemplary method for wirelessly charging using a magnetic field transfer circuit in accordance with an embodiment.

FIG. 11 is a flow chart illustrating an exemplary method for wirelessly charging using a magnetic field transfer circuit in accordance with an embodiment. In S1102, magnetic field transfer circuit 104 may receive a first magnetic flux transmitted from a transmitter (e.g., charging pad 102) using a first coil. In some embodiments, the transmitter may include or be connected to a power supply (e.g., a battery or an external power source). The transmitter may convert the electrical power into power stored in a first magnetic field, for example, using a transmitter coil to transmit a first magnetic flux corresponding to the first magnetic field when the current passing through the wound wire. Magnetic field transfer circuit 104 may be disposed at somewhere in the first magnetic field where part of the first magnetic flux may pass through a surface of a first coil of magnetic field transfer circuit 104. In some embodiments, the area of the surface of the first coil for receiving the first magnetic flux may be large enough to collect enough part of the first magnetic flux. In some other embodiments, the surface of the first coil of magnetic field transfer circuit 104 may be close enough to the transmitter coil to collect enough part of the first magnetic flux.

In S1104, the first coil of magnetic field transfer circuit 104 may convert the received magnetic flux to a current. For example, the transmitter coil may generate magnetic current which causes a voltage on magnetic field transfer circuit 104. The voltage may cause a current passing through magnetic field transfer circuit 104. In some embodiments, magnetic field transfer circuit 104 may include a connecting circuit configured to transmit the current caused by the magnetic current to a second coil of magnetic field transfer circuit 104.

In S1106, magnetic field transfer circuit 104 may transmit a second magnetic flux to a receiver (e.g., electrical load 106) using the second coil. For example, the second coil may generate and store energy in a second magnetic field when a current passing through it. A second magnetic flux corresponding to the second magnetic field would transmit electrical power to the receiver when received by a receiver coil of the receiver. In some embodiments, the receiver coil may be electrically connected to a battery to charge the battery or an electrical load to provide electric power directly.

In some embodiments, the connecting circuit of magnetic field transfer circuit 104 may include one or more passive components such as inductors and/or capacitors for further adjusting the gain of magnetic field transfer circuit 104 and thus for adjusting the coefficient of the wireless charging system. For example, the gain of magnetic field transfer circuit 104 may be adjusted to be low when the coefficient of magnetic field transfer circuit 104 is required to be high (e.g., when the charging distance is long).

In some other embodiments, magnetic field transfer circuit 104 may include switches for controlling the number of passive components connected and the way of connection (e.g., in parallels, in series or in a combination of parallels and series) when to accommodate for different charging distances (e.g., controlling the applicable charging distance of the wireless charging system). For example, magnetic field transfer circuit 104 may connect with a capacitor of larger capacitance by turning on a switch connected in series with a capacitor of larger capacitance and cut off the connection to a capacitor of smaller capacitance by turning off the switch connected in series with that capacitor.

In some further embodiments, magnetic field transfer circuit 104 may include more than two coils (e.g., 3, 4, 5 or even more) for charging more than one electrical load at the same time. Also, each of the charging coil (e.g., the coil facing the electrical loads) may be individually or in all connected to passive components to individually or collectively adjust the charging distances. It is known to a person skilled in the art that the number of the charging coils and the manner of connecting the passive components to the coils are not mean to be limited to the embodiments disclosed herein.

In some embodiments, the transmitter may transmit to and/or receive from magnetic field transfer circuit 104 and/or the receiver control information via in-band communication passing through magnetic field transfer circuit 104. For example, the receiver may detect the delivered power/voltage, compares it to the target value, generate the control information based on the relationship between delivered power and target power, and send the control information via the receiver coil (e.g., using in-band modulation). Then the second coil of magnetic field transfer circuit facing the receiver, receives the control information and reflects the information on the first coil of magnetic field transfer circuit through the connecting circuit. Because the first coil is facing the transmitter, the transmitter may receive the control information and extract the instructions included (e.g., using in-band demodulation) and regulate the delivered power level based on the instructions extracted. In some embodiments, the control information may also include other functions such as stop charging, foreign objective detection, fast charging mode activation, etc.

By using the magnetic field transfer circuit disclosed herein, the coupling coefficient of the wireless charging for a longer distance (e.g., longer than several centimeters) may be improved. Thus, different kinds of in-band communications may be realized in the same wireless charging system because of the improved coupling coefficient, which makes the compatibility of wireless charging protocols possible within wide range of distance. Also, by adjusting the number of passive components connected to the magnetic field transfer circuit, the wireless charging system disclosed herein can further control the gain of the system and thus accommodate for different wireless charging distances.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:

1. A magnetic field transfer circuit (MFTC), comprising:
a first coil configured to receive a first magnetic flux transmitted from a transmitter and convert the received magnetic flux to a current;
a second coil configured to transmit a second magnetic flux to a receiver based on the current; and
a connecting circuit comprising at least one passive component electrically connected between the first and second coils, the connecting circuit being configured to dynamically control a coupling coefficient of the transmitter and the receiver.

2. The MFTC of claim 1, wherein the passive component is at least one of an inductor or a capacitor.

3. The MFTC of claim 2, wherein the passive component is electrically connected in parallel with the first or the second coil.

4. The MFTC of claim 2, wherein the passive component is electrically connected in series with the first or the second coil.

5. The MFTC of claim 1, wherein the connecting circuit further comprises at least one switch configured to control a number of passive components electrically connected between the first and the second coils.

6. The MFTC of claim 5, wherein the switch is at least one of a semiconductor device or a mechanical device.

7. The MFTC of claim 1, wherein the first coil and the second coil of the MFTC are further configured to transmit control information to the receiver based on in-band communication.

8. The MFTC of claim 7, wherein the in-band communication is based on modifying the current or a voltage within the MFTC.

9. The MFTC of claim 1, wherein at least one of the first coil or the second coil comprises a ferrite.

10. A method for wireless charging, comprising:
receiving a first magnetic flux transmitted from a transmitter using a first coil;
converting the received magnetic flux to a current;
transmitting a second magnetic flux to a receiver based on the current using a second coil; and
dynamically controlling a coupling coefficient of the transmitter and the receiver using a connecting circuit comprising at least one passive component electrically connected between the first and the second coils.

11. The method of claim 10, further comprising controlling a number of passive components connected to the first and the second coil using at least one switch.

12. The method of claim 10, further comprising receiving control information from the transmitter based on an in-band communication.

13. The method of claim 10, further comprising transmitting the control information to the receiver based on the in-band-communication.

14. A system for wireless charging, comprising:
a transmitter configured to transmit a first magnetic flux; and
a magnetic field transfer circuit (MFTC) configured to:
receive the first magnetic flux from the transmitter using a first coil;
convert the received first magnetic flux into a current;
transmit a second magnetic flux to a receiver using a second coil; and
dynamically control a coupling efficient of the MFTC using a connecting circuit comprising at least one passive component electrically connected between the first and the second coil;
wherein control information is transmitted between the transmitter and the MFTC via in-band communication using the first coil and the second coil.

15. The system of claim 14, wherein the in-band communication is based on modulation of the current or a voltage within the MFTC.

16. The system of claim 15, wherein the connecting circuit further comprises at least one switch configured to control the number of the passive components electrically connected between the first coil and the second coil.

17. The system of claim 15, wherein the switch is at least one of a semiconductor device or a mechanical device.

* * * * *